Dec. 8, 1936.　　　C. T. WALTER　　　2,063,279
CASING TREATMENT
Filed May 28, 1936
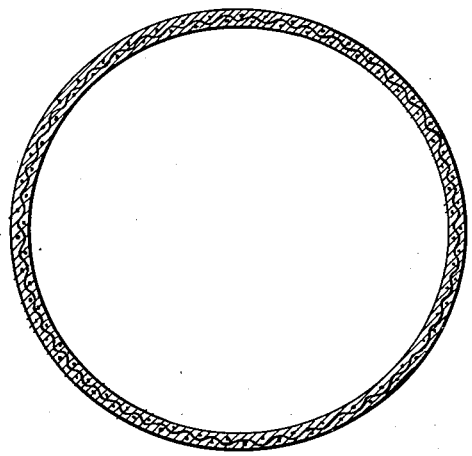
Charles T. Walter
INVENTOR
WITNESS-
BY
ATTORNEY Patented Dec. 8, 1936

2,063,279

UNITED STATES PATENT OFFICE 2,063,279

CASING TREATMENT

Charles T. Walter, Chicago, Ill., assignor to Industrial Patents Corporation, Chicago, Ill., a corporation of Delaware Application May 28, 1936, Serial No. 82,269

14 Claims. (Cl. 99—175)

This invention relates to the treatment of casings.

One of the objects of the invention is to provide a method for treating animal casings.

Another object of the invention is to provide a method for preparing printed sausage casings.

Another object of the invention is to provide a novel preprinted sausage casing.

Another object of the invention is to prepare a sausage product bearing printed characters.

Other objects will be apparent from the description and claims which follow.

The drawing is a sectional view of an animal casing prepared in accordance with the present invention.

In the practice of the present invention natural casings, that is, animal intestines cleaned and treated in the conventional manner for the preparation of sausage casings, are employed.

I have discovered that with many types of natural casings it is difficult to secure the adherence of a surface finish. In carrying out the present invention I treat the natural cleaned casing with a formaldehyde solution, preferably a strong solution, that is, a strength of 40 per cent or greater, although successful results may be secured with weaker formaldehyde solutions, for example, a 30 per cent formaldehyde solution.

After treatment with the formaldehyde solution, the outer surface of the casing is covered with cellulose viscose which is then regenerated as by immersion in a suitable regenerating bath such as, for example, a solution of sodium sulphate slightly acidified with sulphuric acid. The resultant casing is thin and strong and exhibits all the desirable characteristics of natural casings with the additional feature of a smooth glossy surface which may be printed with facility.

The regenerated cellulose viscose is substantially pure cellulose which is porous to water vapor, is wetted by water, and when wetted stretches considerably without breaking. This substance, as is well known in the sausage making art, takes smoke well and is in many respects satisfactory as a casing material.

The present invention involves the use of a natural casing having the cellulose film affixed thereto through the agency of formaldehyde or any other suitable protein precipitant, as, for example, any aldehyde or alum, although formaldehyde is the preferred fixative. Although I have found that a cellulose film may be regenerated from cellulose viscose upon the outer surface of sausage casings to give satisfactory results for certain purposes, I have found that the simple treatment of a natural casing with cellulose viscose subsequently regenerated does not provide a finished casing which will withstand the treatment involved in certain types of sausage processing where high temperatures and excessive moisture are involved. I have found that the protein precipitant may be employed in any desired manner in addition to direct application to the casing before the application of cellulose viscose as I have previously described. The protein precipitant may be applied to the surface prior to or simultaneously with the application of the cellulose viscose as by admixture therewith or after the cellulose viscose has been regenerated on the casing. A casing so treated has the permanent gloss and smooth surface of a typical artificial casing, together with the strength and resiliency of a natural casing.

The cellulose film may be applied after the natural casing is printed or prior to the printing, depending on whether it is desired to have the printed characters beneath the film or on the outer surface of the film.

In printing the casings either before or after the application of the cellulose film, any suitable ink may be used. The following formula for ink is merely suggestive. Percentages are by weight.

| | Percent |
|---|---|
| Pigment (such as an oxide of titanium) | 60–65 |
| Fluid medium or menstruum | 40–35 |

The fluid medium, or fluid vehicle, which carries the pigments, preferably comprises:

| | Percent |
|---|---|
| Water-proof spar varnish | 10–20 |
| Unsaponifiable waxy or greasy matter (for example 5 to 7 parts of paraffin and 100 parts petroleum jelly) | 5–10 |
| Lithographic linseed oils (litho-oils) | 70–85 |

Any suitable spar varnish may be employed. Preferably a varnish known in the varnish trade as "long oil" China-wood varnish is used. For example, the varnish may comprise 25 gallons of a drying oil, preferably China-wood oil, to 100 pounds of a natural or synthetic resin, or a combination of such resins. Thus, ester gum, other natural gums, or synthetic gums, such as potentially reactive phenol-condensation products, may be employed.

A suitable water-proof spar varnish may be used in accordance with the specifications of the Bureau of Standards, entitled "United States Government Master Specification for Varnish, Spar Water Resisting," Federal Specifications Board No. 18b.

Any suitable substitute may be employed for the paraffin and petroleum jelly mixture of the waxy character set forth above. Where a mixture of paraffin and petroleum jelly is employed, preferably they are in the proportion of 5 to 7 parts paraffin to 100 parts of petroleum jelly.

The lithographic linseed oil employed is one which has been changed in consistency by the application of heat. A suitable range of consistencies is from 0000 to No. 8, as designated in the trade pertaining to litho-oils.

If it is desired to apply the cellulose film over the printed characters, the casing is treated with formaldehyde, printed with an ink such as has been described, and then coated with a film of cellulose viscose which may be applied in any desired manner as by spraying or dipping.

If the ink employed is slow to dry and harden, it is preferable to delay the application of formaldehyde until after the ink has hardened in order to insure a sufficient concentration of formaldehyde at the time of the application of the cellulose viscose.

In carrying out the present invention I prefer to treat the natural casing with formaldehyde, promptly thereafter apply the cellulose viscose, and print upon the surface of the cellulose after regenerating. The cellulose viscose is preferably prepared in a dilute solution as by diluting one part of the usual commercial solution of cellulose viscose with three parts of water.

After the regeneration of the cellulose viscose into cellulose, the casing may be treated with a hygroscopic agent such as a solution of glycerine to prevent the finished casing from becoming brittle.

Animal casings treated in this manner may be stored and stuffed out with foods such as meat, exactly as casings which have not been printed or treated.

After stuffing, the sausage may be smoked and processed without danger of a separation of the cellulose film from the casing surface.

I claim:

1. The method of treating natural casings which comprises treating the casing with formaldehyde, coating the surface with cellulose viscose, and regenerating the cellulose viscose.

2. The method of treating casings which comprises applying formaldehyde and printed characters to the surface of the casing, and thereafter coating the surface with cellulose viscose over the printed characters, and regenerating the cellulose viscose.

3. The method of treating natural casings which comprises treating the casing with a protein precipitant, coating the surface with cellulose viscose, and regenerating the cellulose viscose.

4. The method of treating casings which comprises applying a protein precipitant and printed characters to the surface of the casing, and thereafter coating the surface with cellulose viscose over the printed characters and regenerating the cellulose viscose.

5. A sausage casing comprising a portion of animal intestine having an outer film of cellulose bonded thereto with a protein precipitant.

6. A sausage casing comprising a portion of animal intestine having an outer film of cellulose bonded thereto with a protein precipitant and printed characters between the outer surface of the intestine and the film of cellulose.

7. A sausage casing comprising a portion of animal intestine having an outer film of cellulose bonded thereto with a protein precipitant and printed characters upon the outer surface of the film of cellulose.

8. A sausage casing comprising a portion of animal intestine having an outer film of cellulose bonded thereto with formaldehyde.

9. A sausage casing comprising a portion of animal intestine having an outer film of cellulose bonded thereto with formaldehyde and printed characters between the outer surface of the intestine and the film of cellulose.

10. A sausage casing comprising a portion of animal intestine having an outer film of cellulose bonded thereto with formaldehyde and printed characters upon the outer surface of the film of cellulose.

11. A sausage comprising a casing and a filling including meat, the casing comprising a portion of animal intestine having an outer film of cellulose bonded thereto with formaldehyde.

12. A sausage comprising a casing and a filling including meat, the casing comprising a portion of animal intestine having an outer film of cellulose bonded thereto with a protein precipitant.

13. A sausage comprising a casing and a filling including meat, the casing comprising a portion of animal intestine having an outer film of cellulose bonded thereto with formaldehyde and bearing printed characters.

14. A sausage comprising a casing and a filling including meat, the casing comprising a portion of animal intestine having an outer film of cellulose bonded thereto with a protein precipitant and bearing printed characters.

CHARLES T. WALTER.